United States Patent [19]

Giere

[11] Patent Number: 4,722,243
[45] Date of Patent: Feb. 2, 1988

[54] VEHICLE TRANSAXLE AND LOCKING DIFFERENTIAL AND BRAKE ASSEMBLY THEREFOR

[75] Inventor: David W. Giere, Chaska, Minn.

[73] Assignee: Eaton Corporation, Cleveland, Ohio

[21] Appl. No.: 923,463

[22] Filed: Oct. 27, 1986

Related U.S. Application Data

[63] Continuation-in-part of Ser. No. 769,033, Aug. 26, 1985, Pat. No. 4,696,164.

[51] Int. Cl.$^4$ .................. F16H 1/44; F16H 57/10
[52] U.S. Cl. .................. 74/710.5; 74/756; 192/4 A
[58] Field of Search ............. 74/710.5, 756; 192/4 A

[56] References Cited

U.S. PATENT DOCUMENTS

| | | | |
|---|---|---|---|
| 2,424,942 | 7/1947 | Mynssen | 74/315 |
| 2,874,790 | 2/1959 | Hennessey | 180/6.2 |
| 2,978,929 | 4/1961 | Roberts | 74/711 |
| 3,474,689 | 10/1969 | Young | 74/711 |
| 3,751,924 | 8/1973 | Brown et al. | 60/485 |
| 3,905,457 | 9/1975 | Shea | 74/710.5 X |
| 4,377,094 | 3/1983 | Thompson et al. | 74/710.5 |

FOREIGN PATENT DOCUMENTS

| | | |
|---|---|---|
| 1816183 | 6/1970 | Fed. Rep. of Germany . |
| 1945439 | 3/1971 | Fed. Rep. of Germany . |
| 1487479 | 5/1967 | France . |
| 2478766 | 9/1981 | France . |
| 281003 | 5/1952 | Switzerland . |
| 287435 | 4/1953 | Switzerland . |
| 853197 | 11/1960 | United Kingdom . |
| 0821239 | 4/1981 | U.S.S.R. . |

Primary Examiner—Dirk Wright
Attorney, Agent, or Firm—D. A. Rowe; L. J. Kasper

[57] ABSTRACT

A transaxle assembly (T) is disclosed for transmitting drive torque from an engine (E) to a pair of drive wheels (W). The assembly (T) includes an open differential (11) including a pair of output shafts (25) which transmit drive torque to right and left axle shafts (31) and (33). Disposed between the axle shafts is a locking differential and parking brake mechanism (35) including an engagement mechanism (39) and an actuation mechanism (41). When a manual selector lever (37) is in its N mode, the engagement mechanism (39) is not actuated and normal differentiation can occur between the axle shafts (31) and (33). The actuation mechanism (41) can be actuated by the lever (37) to either a locking differential or L mode (FIG. 5) or a braking or B mode (FIG. 6). In the L mode, the axle shafts (31) and (33) are fixed relative to each other but are free to rotate relative to the vehicle frame (F). In the B mode, the axle shafts (31) and (33) are fixed relative to each other and are also fixed relative to the frame (F).

12 Claims, 6 Drawing Figures

VEHICLE TRANSAXLE AND LOCKING DIFFERENTIAL AND BRAKE ASSEMBLY THEREFOR

CROSS-REFERENCE TO RELATED APPLICATION

This application is a continuation-in-part of U.S. Ser. No. 769,033, filed Aug. 26, 1985 now U.S. Pat. No. 4,696,164.

BACKGROUND OF THE DISCLOSURE

The present invention relates to vehicle transaxle assemblies of the type including some sort of interwheel differential, and more particularly, to such assemblies which have the capability for the operator to select from among various operating modes.

Certain vehicles, such as lawn and garden tractors, have used transaxle assemblies for transmitting engine torque to a pair of ground-engaging drive wheels to propel the vehicle. A typical transaxle assembly which has been used commercially includes an open, gear-type differential having an output gear (side gear) associated with each of the drive wheels. In such transaxle assemblies, the input drive to the differential may be a direct mechanical drive from the vehicle engine, such as by means of a V-belt, or may be a hydrostatic transmission.

Vehicles which utilize transaxle assemblies frequently encounter operating conditions in which one of the drive wheels has less traction than the other drive wheel. It has long been recognized by the manufacturers of such vehicles that it is desirable to provide the operator of the vehicle with some type of control arrangement for effectively dealing with such loss of traction situations. At the same time, however, it is recognized that under most operating conditions, the vehicle must be able to have "normal differentiation" between the two drive wheels, i.e., it must be possible for the two drive wheels to be driven at substantially different speeds, such as during a sharp turn.

In addition to dealing with the loss of traction situation, there are various other operating conditions which occur with such vehicles. For example, it is normally desirable for vehicles of this type to have some sort of parking brake to be applied only when the vehicle is at a standstill, and it is especially desirable to incorporate such a parking brake into the transaxle assembly.

PRIOR ART

As noted previously, many of the commercially used transaxle assemblies have included a hydrostatic transmission (HST) and a mechanical axle assembly including an open, gear-type differential. The HST would typically be a light-duty HST such as the Model 11 sold by Eaton Corporation, and comprising a variable displacement, radial ball pump and a fixed displacement, radial ball motor. The HST would transmit engine torque to the input of the mechanical axle assembly which would typically include, in addition to the differential, some sort of speed reduction gearing.

On such mechanical axle assemblies, it is known to provide an automotive-type limited slip or locking differential to prevent spin out of one drive wheel relative to the other, during loss of traction situations. Although such a transaxle assembly, including a limited slip or locking differential, has provided generally satisfactory performance, the excessive cost of such a differential makes the overall transaxle assembly commercially less desirable. In addition, in vehicle applications where a parking brake is desired, the parking brake may be applied to the drive shaft. In such an arrangement, there is no positive braking of the wheels, and the wheels are free to counterrotate because, with a standard open differential having an input member and two output members, two of the three members must be fixed relative to the vehicle frame in order to provide braking action.

SUMMARY OF THE INVENTION

Accordingly, it is an object of the present invention to provide a transaxle assembly which overcomes the problems associated with the prior art transaxle assemblies described above, while dealing effectively with loss of traction situations.

It is a more specific object of the present invention to provide a transaxle assembly which achieves the above-stated objects, while providing the operator with the capability of selecting among a normal differentiating mode of operation, a limited (or locked) differentiating mode of operation, and a braking mode of operation.

The above and other objects of the present invention are accomplished by the provision of an improved axle assembly for use on a vehicle having a source of motive power, a vehicle frame, and a pair of driven wheels. The axle assembly includes interwheel differential means having a pair of outputs drivingly connected to the pair of driven wheels. Each of the outputs of the interwheel differential means includes an output gear member having its axis of rotation fixed relative to the vehicle frame, and a speed of rotation representative of the speed of rotation of the respective output.

The axle assembly is characterized by the interwheel differential means comprising first and second lock gear members in toothed engagement with the output gear members. The interwheel differential means further comprises engagement means operably associated with the first and second lock gear members. A manually actuatable actuation means is operably associated with the engagement means and is selectively operable to move the engagement means among:

(i) a first position in which the first and second lock gear members are free to rotate relative to each other, thus permitting normal differentiation between the speeds of the driven wheels;

(ii) a second position in which the first and second lock gear members are fixed relative to each other, but rotatable relative to the vehicle frame, thus preventing normal differentiation between the speeds of the driven wheels; and (iii) a third position in which the first and second lock gear members are fixed relative to each other, and relative to the vehicle frame, thus providing a locked mode of the interwheel differential means.

DESCRIPTION OF THE PREFERRED EMBODIMENT

Figure 1:
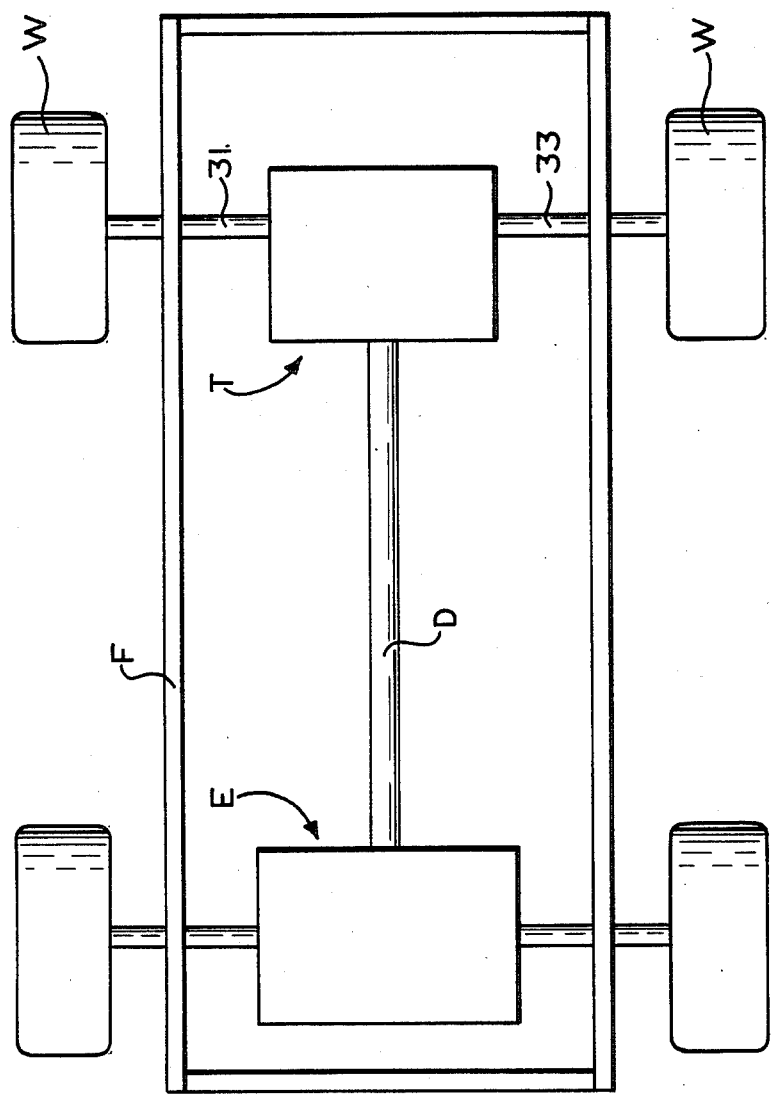
FIG. 1 is a somewhat schematic, top plan view of the chassis and drive train of a vehicle such as a garden tractor equipped with a transaxle assembly made in accordance with the present invention.

Referring now to the drawings, which are not intended to limit the invention, FIG. 1 is a top plan view, in schematic form, showing only the vehicle chassis and drive train of a typical garden tractor. The tractor includes a vehicle chassis or frame F, which supports a vehicle engine E disposed adjacent the front end of the vehicle and supported in a known manner. The tractor also includes a pair of ground-engaging drive wheels W which are adapted to be driven by a transaxle assembly, generally designated T. For ease of illustration in FIG. 1, the transaxle assembly T has been illustrated as being of the type having the input driven directly from the engine. The engine torque is transmitted to the transaxle assembly T by means of a drive shaft D, as is well known to those skilled in the art.

Figure 2:
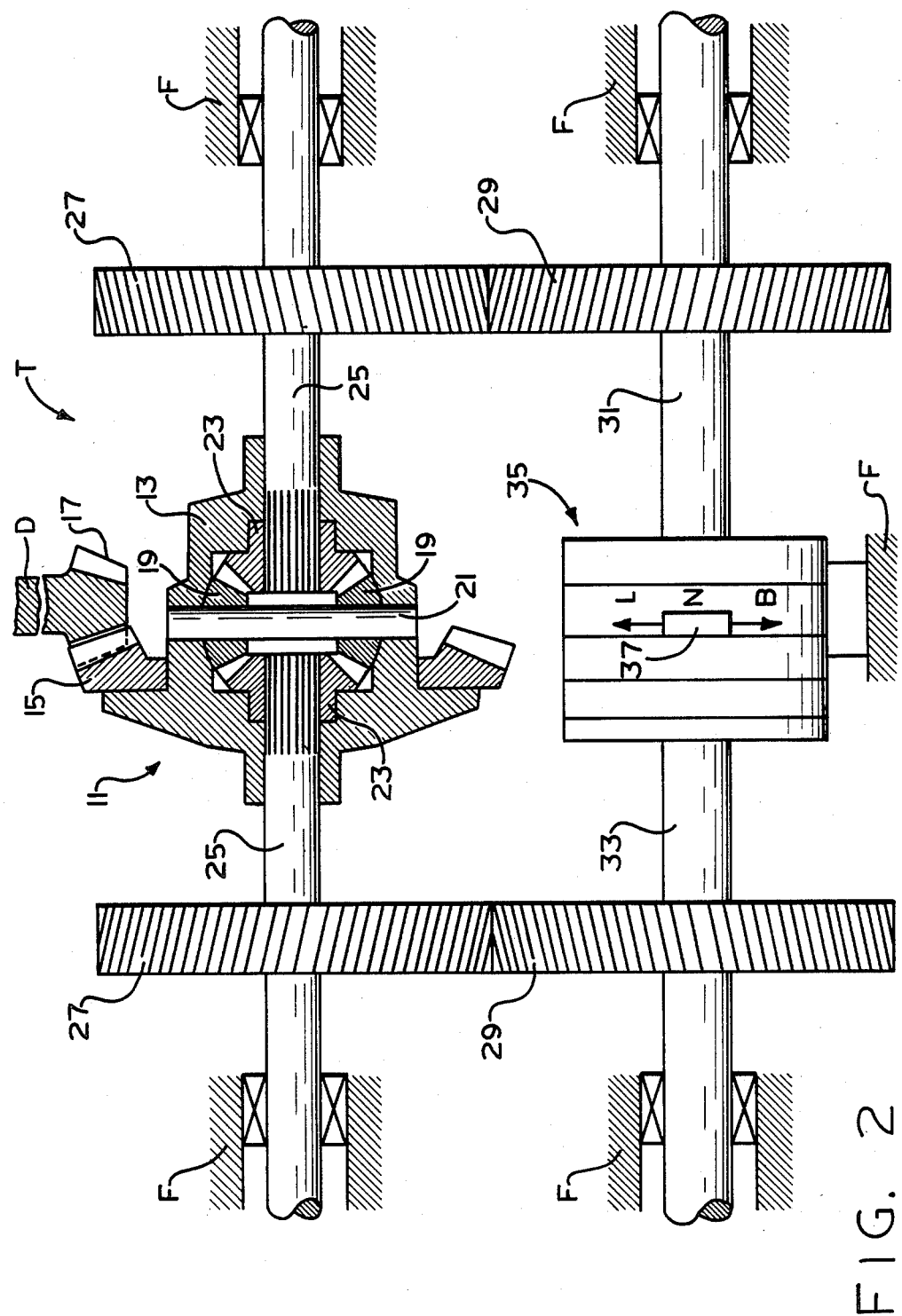
FIG 2 is a somewhat schematic view, partly in section and partly in plan view of one embodiment of a transaxle assembly, made in accordance with the present invention.

Referring now to FIG. 2, there is illustrated a somewhat schematic view of the transaxle assembly T of FIG. 1. In the subject embodiment, the transaxle assembly T includes a conventional open differential, generally designated 11, including a housing 13 and a ring gear 15. As is well known, the ring gear 15 receives input drive torque from a pinion 17, which is driven by the vehicle drive shaft D.

The differential 11 includes a pair of pinion gears 19 which are rotatably disposed on a pinion shaft 21. In engagement with the pinion gears 19 is a pair of side gears 23 which are splined to a pair of output shafts 25. The output shafts 25 are supported by suitable bearing means for rotation relative to the housing of the transaxle assembly T. Mounted on each of the output shafts 25 and fixed for rotation therewith is a gear member 27, illustrated schematically in FIG. 2 as being a helical spur gear.

In toothed engagement with each of the gear members 27 is a lock gear 29. One of the lock gears 29 is mounted on a right axle shaft 31 and the other lock gear 29 is mounted on a left axle shaft 33, each of the lock gears 29 being fixed for rotation with its respective axle shaft 31 or 33. The right and left axle shafts 31 and 33 are supported by suitable bearing means for rotation relative to the frame F of the transaxle assembly T.

Disposed between the right and left axle shafts 31 and 33 is a locking differential and parking brake mechanism, generally designated 35. The mechanism 35 includes several portions which are fixed relative to the frame F of the transaxle assembly T, as is illustrated schematically in FIG. 2, and as will be described in greater detail subsequently. The mechanism 35 includes a manual selector lever 37 which, in the subject embodiment, may be moved manually by the vehicle operator to any one of three different positions, to choose among three different operating modes. In FIG. 2, the lever 37 is illustrated schematically as being in the normal differentiating mode, designated N. In the N mode, the axle shafts 31 and 33 are permitted to rotate freely relative to each other, and therefore, whatever amount of differentiation occurs in the open differential 11 is simply transmitted through the output shafts 25, gear members 27, lock gears 29, and then by the axle shafts 31 and 33 to the drive wheels W.

If the selector lever 37 is moved forward by the vehicle operator (upward in FIG. 2) the mechanism 35 is in a locking differential mode, designated L. In the L mode, the right and left axle shafts 31 and 33 are fixed relative to each other to prevent normal differentiation in the open differential 11, thus assuring that the drive wheels W are driven at the same rotating speed. The functional result of operation in the L mode is approximately the same as occurs in a typical automotive vehicle equipped with a locking differential, except that the typical automotive locking differential achieves the locked condition automatically in response to a wheel spinout, whereas the mechanism 35 may be manually put in the L mode by the operator when it is believed that a loss of traction situation is likely to occur. Referring still to FIG. 2, if the lever 37 of the mechanism 35 is moved rearwardly by the operator (downward in FIG. 2), the mechanism 35 operates in a braking mode, designated B. Preferably, the B mode is intended as a parking brake, to be applied only after the vehicle has come to a complete stop, not to be applied as a dynamic brake while the vehicle is still moving. In the B mode, the right and left axle shafts 31 and 33 are fixed relative to each other, and also fixed relative to the frame F of the transaxle assembly T.

Figure 3:
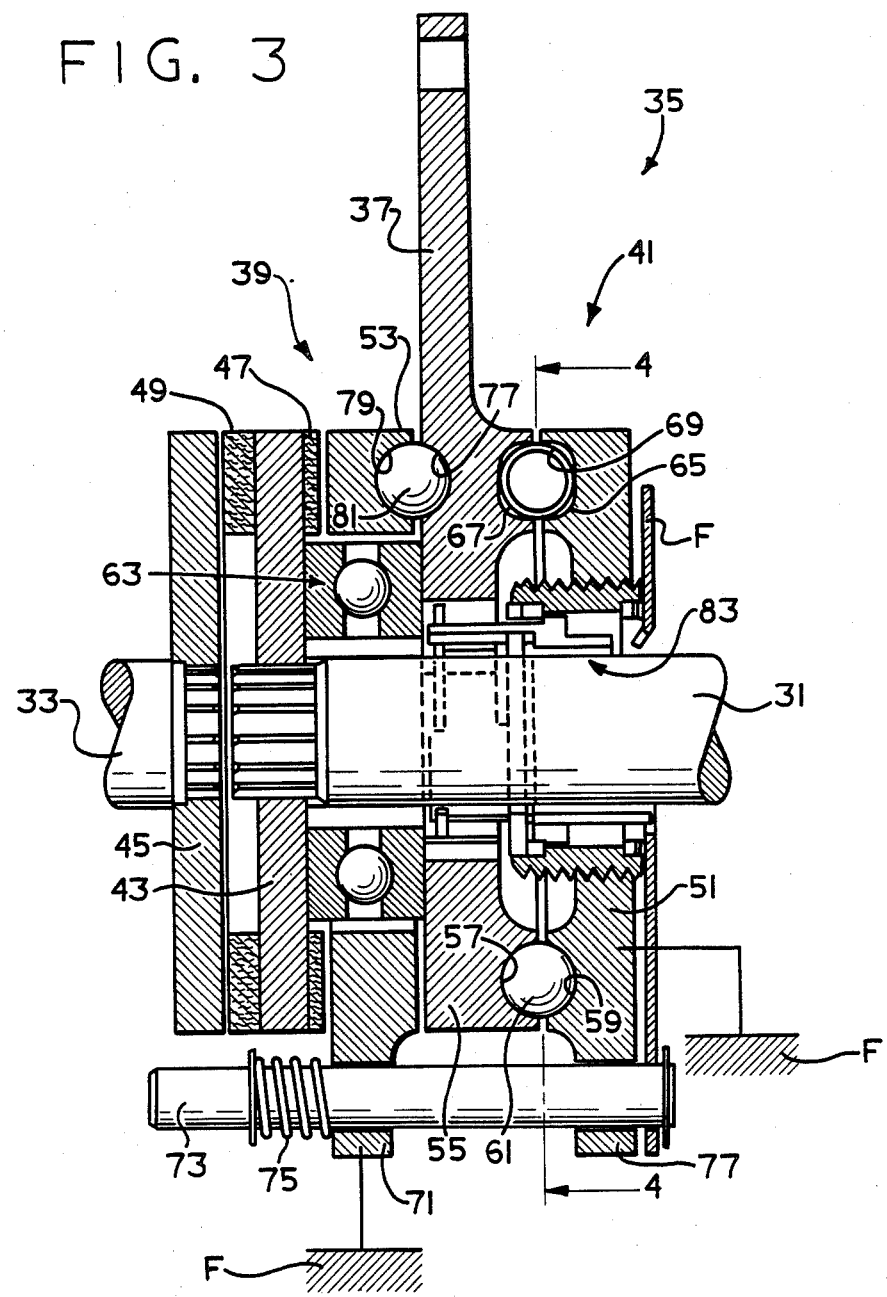
FIG. 3 is an axial cross-section illustrating the locking differential and parking brake mechanism shown sche

Referring now primarily to FIG. 3, the locking differential and parking brake mechanism 35 will be described in structural detail. The mechanism 35 includes an engagement mechanism, generally designated 39, and an actuation mechanism, generally designated 41. The general purpose of the engagement mechanism 39 is to prevent relative rotation between the right and left axle shafts 31 and 33 in the L mode, and between the axle shafts 31 and 33 and the frame F in the B mode. The general purpose of the actuation mechanism 41 is simply to actuate the engagement mechanism 39.

Figure 4:
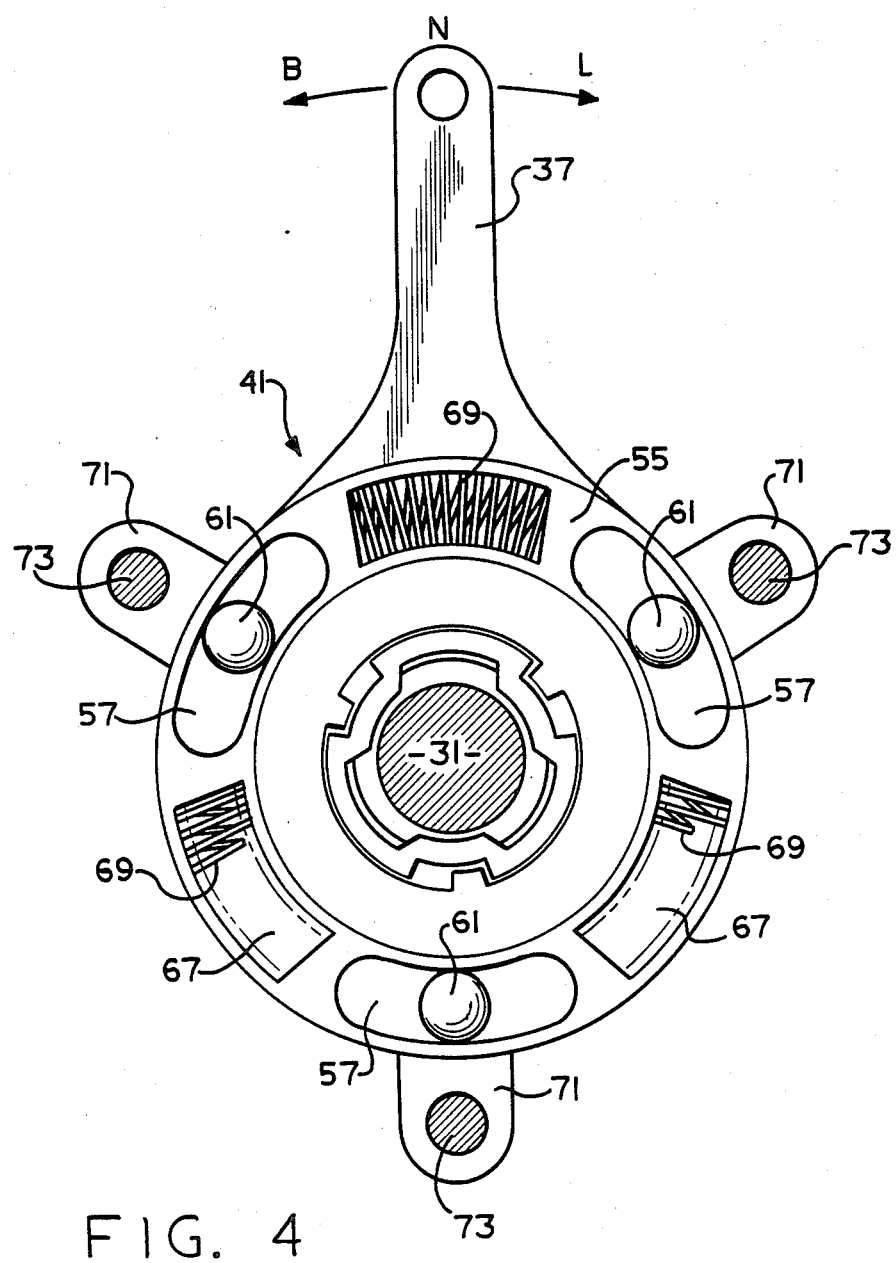
- FIG. 4 is a transverse cross-section taken on line 4—4 of FIG. 3, and on the same scale.

Referring still to FIG. 3, in conjunction with FIG. 4, the engagement mechanism 39 comprises a drive plate 43, which is splined to the right axle shaft 31, and a drive plate 45, which is splined to the left axle shaft 33. Disposed on the righthand surface of the drive plate 43 is a friction disc 47, and disposed on the lefthand surface of the drive plate 43 is a friction disc 49. The actuation mechanism 41 comprises a fixed cam plate 51 and a fixed cam plate 53. As used herein, the term "fixed" in reference to the cam plates 51 and 53 simply means that they are prevented from rotating relative to the frame F of the transaxle assembly T, as is illustrated schematically in FIG. 3, although the cam plate 53 is free to move axially as will be described subsequently. Disposed between the fixed cam plates 51 and 53 is an input cam member 55, which is shown in FIG. 3 as being integral with the manual selector lever 37, such that pivotal movement of the lever 37 as shown in FIG. 4 rotates the input cam member 55 away from the neutral position shown in FIGS. 3 and 4.

Figure 5:
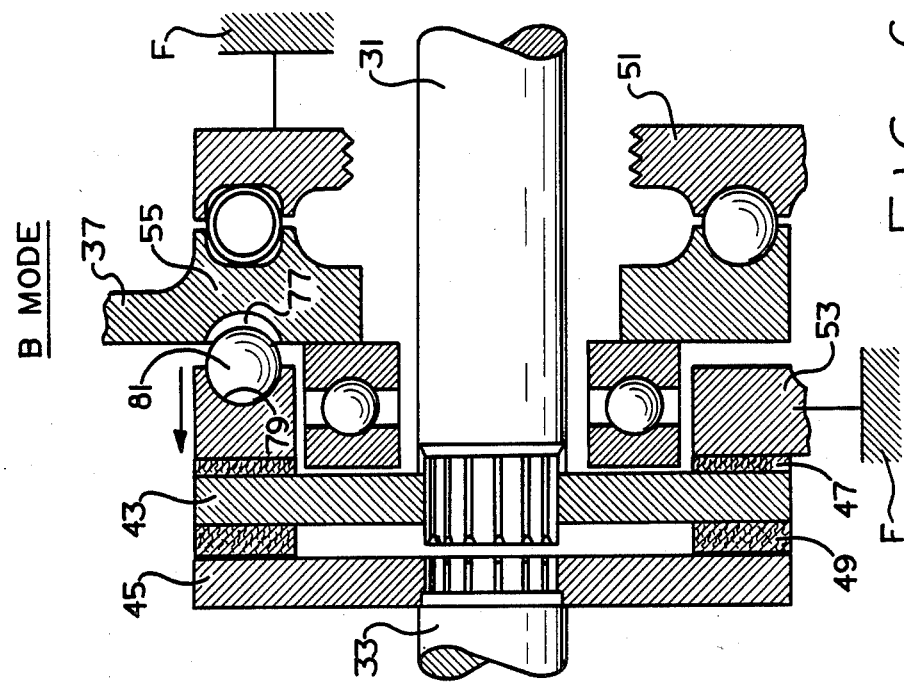
FIG. 5 is a simplified axial cross-section. similar to FIG. 3, illustrating the mechanism in the locking differential mode.

As may best be seen in FIG. 5, the input cam member 55 defines three cam ramp surfaces 57, while the fixed cam plate 51 defines three adjacent cam ramp surfaces 59. Disposed between the cam ramp surfaces 57 and 59 are cam balls 61, and the surfaces 57 and 59 and cam balls 61 together provide a cam ramp actuator which results in axial movement of the input cam member 55 to the left (see arrow in FIG. 5) in response to rotation of the lever 37 in the clockwise direction in FIG. 4.

Disposed between the input cam member 55 and the drive plate 43 is a thrust bearing set 63. Movement of the lever 37 to the L mode results in movement of the input cam member 55 to the left in FIG. 5 as previously described, which in turn moves the thrust bearing set 63 to the left (see arrow in FIG. 5). This leftward movement of the bearing set 63 in turn moves the drive plate 43 to the left until the friction disc 49 is in tight frictional engagement with the drive plate 45. In the L mode therefore, the drive plates 43 and 45 and the left and right axle shafts 31 and 33 are fixed to rotate together, but are freely rotatable relative to the frame F of the transaxle assembly T.

Referring still to FIGS. 3, 4 and 5, the fixed cam plate 51 defines three arcuate openings 65 and the input cam member 55 defines three adjacent arcuate openings 67. Disposed within each opening 65,67 is a cam centering spring 69, the function of which is constantly to bias the input cam member 55 toward its centered, N mode as shown in FIG. 4, and in a manner well known to those skilled in the art.

Each of the fixed cam plates 51 and 53 includes three integral ears 71, each of the ears 71 defining a bore. As may best be seen in FIG. 3, through each pair of circumferentially aligned ears 71 there extends a cylindrical pin 73. A spring 75 is seated on the pin 73 and biases the fixed cam plate 53 toward the position in which it is shown in FIG. 3, which is the position it occupies when the mechanism 35 is in either the N mode or the L mode.

Figure 6:
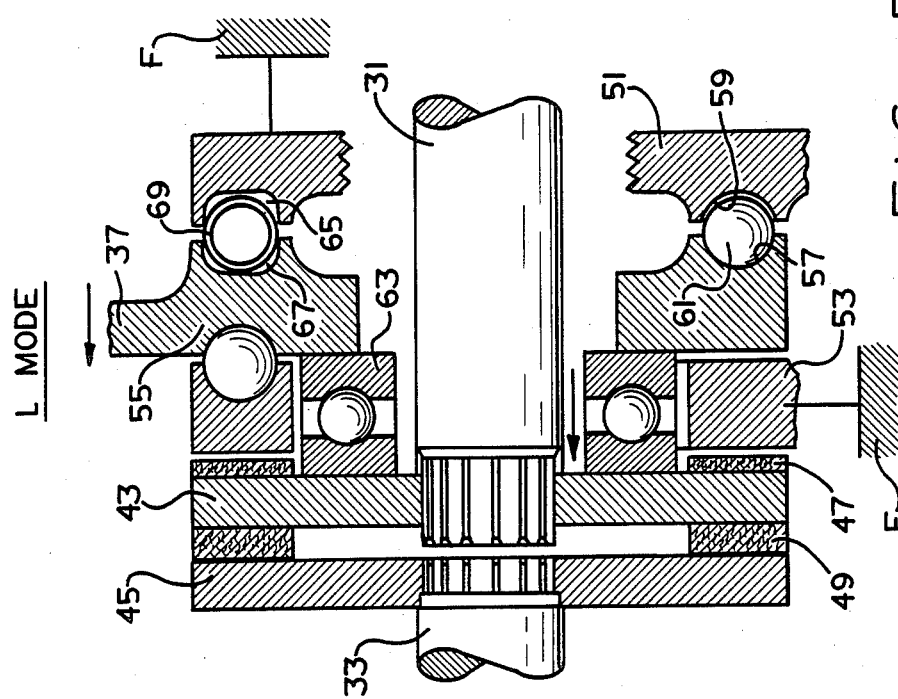
FIG. 6 is a simplified axial cross-section, similar to FIG. 3, illustrating the mechanism in the parking brake mode of operation.

Referring now to FIGS. 3, 4 and 6, the input cam member 55 defines, on its lefthand side in FIGS. 3 and 6, another set of cam ramp surfaces 77, and adjacent each of the surfaces 77 the fixed cam plate 53 defines a cam ramp surface 79. Disposed between each adjacent pair of cam ramp surfaces 77 and 79 is a cam ball 81, the surfaces 77 and 79 and cam balls 81 providing another cam ramp actuator. When the manual selector lever 37 is moved counterclockwise in FIG. 4 to select the B mode, the input cam member 55 rotates counterclockwise in FIG. 4, but does not move axially. The cam ramp surfaces 77 and 79 are configured such that the above-described rotation of the cam member 55 results in movement of the fixed cam plate 53 to the left in FIG. 3 to a position in which the cam plate 53 is in frictional engagement with the friction disc 47, while the friction disc 49 is in engagement with the drive plate 45. Therefore, in the B mode of operation, both of the drive plates 43 and 45 are fixed relative to the cam plate 53, and therefore, are fixed relative to the frame F of the transaxle assembly T, and both the right and left axle shafts 31 and 33 are fixed relative to each other and fixed relative to the frame F of the transaxle assembly T, thus providing a braking mode of operation.

Referring again primarily to FIG. 3, it may be seen that disposed radially between the right axle shaft 31 and the cam plate 51 and input cam member 55 there is disposed a self-adjusting mechanism, generally designated 83 which forms no part of the present invention, and therefore, will not be described in structural detail herein. The general function of the self-adjusting mechanism 83 is to adjust the axial position of the fixed cam plate 51 to compensate or adjust for wear of the friction discs 47 and 49, over the life of the mechanism.

I claim:

1. An axle assembly for use on a vehicle having a source of motive power; a vehicle frame; and a pair of drive wheels; said transaxle assembly including interwheel differential means having a pair of outputs drivingly connected to said pair of drive wheels; said outputs of said interwheel differential means including first and second output gear members, each of said output gear members having its axis of rotation fixed relative to said vehicle frame, and a speed of rotation representative of the speed of rotation of the respective output; characterized by:
   (a) said interwheel differential means further comprising first and second lock gear members in toothed engagement with said first and second output gear members, respectively;
   (b) said interwheel differential means further comprising engagement means operably associated with said first and second lock gear members; and
   (c) actuation means operably associated with said engagement means and selectively operable to move said engagement means among:
      (i) a first position in which said first and second lock gear members are free to rotate relative to each other, thus permitting normal differentiation between the speeds of said drive wheels;
      (ii) a second position in which said first and second lock gear members are fixed relative to each other, but rotatable relative to said vehicle frame, thus preventing normal differentiation between the speeds of said drive wheels; and
      (iii) a third position in which said first and second lock gear members are fixed relative to each other and relative to the vehicle frame, thus providing a braking mode of said interwheel differential means.

2. An axle assembly as claimed in claim 1 characterized by said interwheel differential means comprising an open differential.

3. An axle assembly as claimed in claim 2 characterized by said open differential including a plurality of pinion gears in driving engagement with a pair of side gears operatively associated with said outputs of said interwheel differential means.

4. An axle assembly as claimed in claim 1 characterized by said first lock gear member being fixed to rotate with a right axle shaft and said second lock gear member being fixed to rotate with a left axle shaft.

5. An axle assembly as claimed in claim 4 characterized by said engagement means and said actuation means being operatively associated with said right and left axle shafts, and disposed in surrounding relationship relative thereto.

6. An axle assembly as claimed in claim 1 characterized by said engagement means comprising a first drive member drivingly connected to a right axle shaft and a second drive member drivingly connected to a left axle shaft and first friction means operable to provide frictional engagement of said first and second drive members when said engagement means is in either said second position or said third position.

7. An axle assembly as claimed in claim 6 characterized by said engagement means further comprising second friction means operable to provide frictional engagement of one of said drive members to a member which is rotationally fixed relative to said vehicle frame, when said engagement means is in said third position.

8. An axle assembly as claimed in claim 1 characterized by said actuation means comprising first cam means operable to move said engagement means to said second position in response to pivotal movement of an input member to one position.

9. An axle assembly as claimed in claim 8 characterized by said actuation means comprising second cam means operable to move said engagement means to said third position in response to pivotal movement of an input member to another position.

10. An axle assembly as claimed in claim 9 characterized by said first and second cam means both including a common input cam member having a neutral, centered position in which said engagement means is in said first position, said input cam member being movable in one direction, from said neutral position, to said one position and in the opposite direction, from said neutral position, to said another position.

11. An axle assembly for use on a vehicle having a source of motive power; a vehicle frame; and a pair of drive wheels; said transaxle assembly including interwheel differential means having a pair of outputs drivingly connected to said pair of drive wheels; said outputs of said interwheel differential means including first and second output shafts, each of said output shafts having its axis of rotation fixed relative to said vehicle frame: characterized by:
 (a) said interwheel differential means further comprising first and second axle shafts fixed for rotation at a speed representative of the speed of rotation of said frst and second output shafts, respectively;
 (b) said interwheel differential means further comprising engagement means operably associated with said first and second axle shafts; and
 (c) actuation means operably associated with said engagement means and selectively operable to move said engagement means among;
  (i) a first position in which said first and second axle shafts are free to rotate relative to each other, thus permitting normal differentiation between the speeds of said drive wheels;
  (ii) a second position in which said first and second axle shafts are fixed relative to each other, but rotatable relative to said vehicle frame, thus preventing normal differentiation between the speeds of said drive wheels; and
  (iii) a third position in which said first and second axle shafts are fixed relative to each other and relative to the vehicle frame, thus providing a braking mode of said interwheel differential means.

12. An axle assembly for use on a vehicle having a source of motive power; a vehicle frame; and a pair of drive wheels; said transaxle assembly including interwheel differential means having a pair of outputs and first and second axle shafts driven by said outputs of said differential means, said axle shafts driving said pair of drive wheels; each of said outputs of said differential means and each of said axle shafts having its axis of rotation fixed relative to said vehicle frame; characterized by:
 (a) each of said first and second axle shafts being fixed for rotation at a speed representative of the speed of rotation of the respective one of said outputs of said differential means;
 (b) said interwheel differential means further comprising engagement means operably associated with said first and second axle shafts; and
 (c) actuation means operably associated with said engagement means and selectively operable to move said engagement means among;
  (i) a first position in which said first and second axle shafts are free to rotate relative to each other, thus permitting normal differentiation between the speeds of said drive wheels;
  (ii) a second position in which said first and second axle shafts are fixed relative to each other, but rotatable relative to said vehicle frame, thus preventing normal differentiation between the speeds of said drive wheels; and
  (iii) a third position in which said first and second axle shafts are fixed relative to each other and relative to the vehicle frame, thus providing a braking mode of said interwheel differential means.

* * * * *